(12) United States Patent
Huang

(10) Patent No.: US 10,679,026 B2
(45) Date of Patent: Jun. 9, 2020

(54) METHOD AND DEVICE FOR CONTROLLING FINGERPRINT SENSOR AND STORAGE MEDIUM

(71) Applicant: Beijing Xiaomi Mobile Software Co., Ltd., Beijing (CN)

(72) Inventor: Xuebin Huang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 99 days.

(21) Appl. No.: 16/037,066

(22) Filed: Jul. 17, 2018

(65) Prior Publication Data

US 2019/0026528 A1 Jan. 24, 2019

(30) Foreign Application Priority Data

Jul. 19, 2017 (CN) .......................... 2017 1 0591711

(51) Int. Cl.
*G06K 9/00* (2006.01)
*G06F 3/041* (2006.01)

(52) U.S. Cl.
CPC ....... *G06K 9/00013* (2013.01); *G06F 3/0416* (2013.01)

(58) Field of Classification Search
CPC .......................... G06K 9/00013; G06F 3/0416
See application file for complete search history.

(56) References Cited

U.S. PATENT DOCUMENTS

| | | | | |
|---|---|---|---|---|
| 9,697,412 | B2 * | 7/2017 | Ahn | .................... G06K 9/00087 |
| 2015/0198699 | A1 * | 7/2015 | Kuo | ..................... G01S 7/52017 |
| | | | | 367/7 |
| 2017/0169271 | A1 * | 6/2017 | Setterberg | ............ G06K 9/0002 |
| 2019/0303640 | A1 * | 10/2019 | Song | .................... G06K 9/0004 |

FOREIGN PATENT DOCUMENTS

| | | |
|---|---|---|
| CN | 1700239 A | 11/2005 |
| CN | 103135810 A | 6/2013 |
| CN | 103543896 A | 1/2014 |
| CN | 106020671 A | 10/2016 |

(Continued)

OTHER PUBLICATIONS

"User Manual: ProCapture-X", Version 1.1, Green Label, Jun. 2017 (Year: 2017).*

(Continued)

*Primary Examiner* — Utpal D Shah
(74) *Attorney, Agent, or Firm* — Arch & Lake LLP

(57) ABSTRACT

A method and an apparatus, and a storage medium are provided for controlling a fingerprint sensor in the field of fingerprint identification. The method may include: after an instruction for adjusting a sensitivity of the fingerprint sensor is received, displaying a page for adjusting the sensitivity, in which, at least two different optional sensitivities of a target fingerprint detection module in the fingerprint sensor are displayed on the page; receiving an instruction for selecting the sensitivity, in which, the instruction for selecting the sensitivity includes a target value selected by a user from the at least two different optional sensitivities; and setting a sensitivity of the target fingerprint detection module as the target value.

20 Claims, 8 Drawing Sheets

(56) References Cited

FOREIGN PATENT DOCUMENTS

EP        2892002  A2     7/2015

OTHER PUBLICATIONS

Anonymous: "Fingerprint issues,", Aug. 28, 2013, Retrieved from the Internet: UR: http://kb.fingertecusa.com/customer/portal/articles/1280711-fingerprint-issues, 3 pages.
Anonymous: "Genus Biometric Reader—Adjusting Sensitivity and Security—HourDoc Support Center", Jul. 31, 2012, Retrieved from the Internet: URL: https://myhourdoc.zendesk.com/hc/en-us/articles/210288393-Genus-Biometric-Reader-Adjusting-Sensitivity-and-Security, 2 pages.
European Office Action issued in EP Patent Application No. 18184346.7, dated Dec. 17, 2018, 8 pages.
Chinese Office Action issued to Chinese Application No. 102710591711.4 dated Jan. 15, 2020 with English translation, (15p).

* cited by examiner

METHOD AND DEVICE FOR CONTROLLING FINGERPRINT SENSOR AND STORAGE MEDIUM

CROSS REFERENCE TO RELATED APPLICATION

This application is based upon and claims a priority to Chinese Patent Application Serial No. 201710591711.4, filed with the State Intellectual Property Office of P. R. China on Jul. 19, 2017, the entire contents of which are incorporated herein by reference.

TECHNICAL FIELD

The present disclosure generally relates to a field of fingerprint identification, and more particularly, to a method and a device for controlling a fingerprint sensor and a storage medium.

BACKGROUND

Since a fingerprint is unique and unchangeable during a human's lifetime, the fingerprint varies with the people, and with the development of information technology, fingerprint identification technology has been widely used in various fields such as identity authentication.

At present, a fingerprint identification component in a terminal may include a fingerprint sensor, which should avoid an unintended touch as much as possible. The unintended touch refers to that an object contacts with the fingerprint sensor while the fingerprint sensor is unable to recognize a fingerprint. In general, the higher sensitivity of the fingerprint sensor, the greater possibility of detecting the unintended touch; the lower sensitivity of the fingerprint sensor, the smaller possibility of detecting the unintended touch, however, the fingerprint may not be detected. Therefore, the sensitivity of the fingerprint sensor in the terminal should be adjusted before the terminal leaves the factory, such that the fingerprint sensor is able to recognize the fingerprint every time and avoid the unintended touch meanwhile.

However, the sensitivity of the fingerprint sensor in the terminal after the terminal leaves the factory is fixed in related arts, leading to a poor flexibility of the fingerprint sensor for recognizing the fingerprint. Thus, there is a need to provide a method to adjust sensitivity of the fingerprint sensor in the terminal.

SUMMARY

According to a first aspect of the present disclosure, a method for controlling a fingerprint sensor is provided, which includes: after an instruction for adjusting a sensitivity of the fingerprint sensor is received, displaying a page for adjusting the sensitivity, in which, at least two different optional sensitivities of a target fingerprint detection module in the fingerprint sensor are displayed on the page; receiving an instruction for selecting the sensitivity, in which, the instruction for selecting the sensitivity includes a target value selected by a user from the at least two different optional sensitivities; and setting a target sensitivity of the target fingerprint detection module as the target value.

According to a second aspect of the present disclosure, a device for controlling a fingerprint sensor is provided, which includes: a processor; and a memory configured to store instructions executable by the processor. The processor is configured to: after an instruction for adjusting a sensitivity of the fingerprint sensor is received, display a page for adjusting the sensitivity, in which, at least two different optional sensitivities of a target fingerprint detection module in the fingerprint sensor are displayed on the page; receive an instruction for selecting the sensitivity, the instruction for selecting the sensitivity including a target value selected by a user from the at least two different optional sensitivities; and set a target sensitivity of the target fingerprint detection module as the target value.

According to a third aspect of the present disclosure, a non-transitory computer-readable storage medium is provided, when instructions stored in the non-transitory computer-readable storage medium are executed by a processing component in a terminal, the processing component is able to execute a method for controlling a fingerprint sensor, in which the method may include: after an instruction for adjusting a sensitivity of the fingerprint sensor is received, displaying a page for adjusting the sensitivity, in which, at least two different optional sensitivities of a target fingerprint detection module in the fingerprint sensor are displayed on the page; receiving an instruction for selecting the sensitivity, in which, the instruction for selecting the sensitivity includes a target value selected by a user from the at least two different optional sensitivities; and setting a target sensitivity of the target fingerprint detection module as the target value.

BRIEF DESCRIPTION OF THE DRAWINGS

In order to make technique solutions according to embodiments of the present disclosure more apparent, drawings needed to be used in descriptions of the embodiments will be illustrated in the following. Obviously, the drawings to be illustrated in the following only represent some embodiments of the present disclosure, and other drawings can be obtained according these drawings by those having ordinary skills in the related art without making creative labors.

DETAILED DESCRIPTION

In order to make the technical solutions of embodiments of the present invention more clearly, the accompanying drawings used in the description of embodiments of the present invention are briefly described hereunder. Obviously, the described drawings are merely some embodiments of present invention. For persons skilled in the art, other drawings may be obtained based on these drawings without any creative work.

Figure 1:
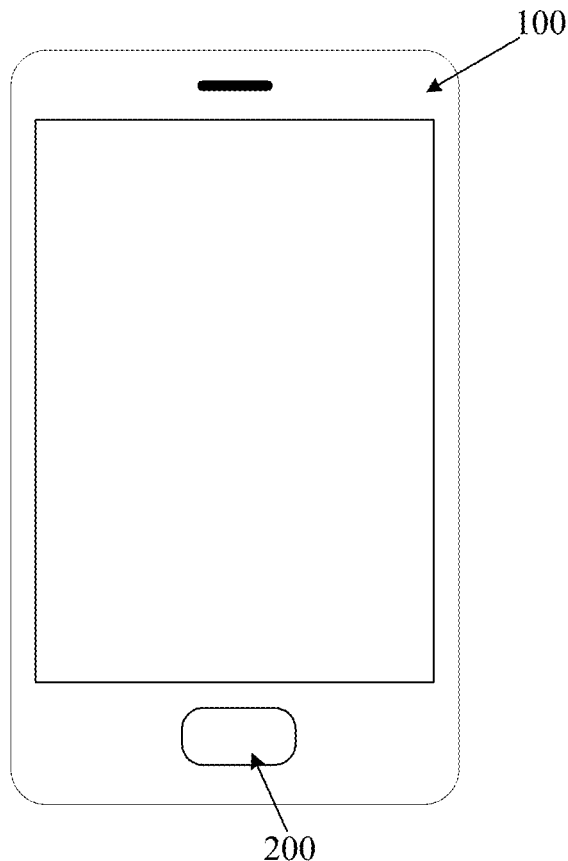
FIG. 1 is a schematic diagram illustrating an operational environment of a method for controlling a fingerprint sensor according to some embodiments of the present disclosure.

Referring to FIG. 1, which is a schematic diagram illustrating an operational environment of a method for controlling a fingerprint sensor according to some embodiments of the present disclosure. The operational environment may include: a terminal 100 and a fingerprint identification component 200 arranged on the terminal 100. The terminal 100 may be a smart phone, a computer, a multi-media player, an electronic reader, a wearable device, or any device including a fingerprint sensor and a controller in communication with the fingerprint sensor.

Here, the fingerprint identification component 200 may include: a fingerprint sensor and other circuitries and software to control the fingerprint sensor. For example, the other circuitries and software may include a digital fingerprint detection (DFD) module and/or an analog fingerprint detection (AFD) module. The AFD module and the DFD module are two kinds of detection modules, both having an object detecting function. One of the difference between the AFD module and the DFD module is that: when the AFD module is working, the fingerprint sensor may remain in a dormant state; when the DFD module is working, the fingerprint sensor may be in an activated state. Since the fingerprint sensor may include different fingerprint detection module, the object detecting function of the fingerprint sensor may be realized in four ways.

In a first way, when the fingerprint sensor includes the AFD module, the object detecting function of the fingerprint sensor is realized by the AFD module.

In a second way, when the fingerprint sensor includes the DFD module, the object detecting function of the fingerprint sensor is realized by the DFD module.

In a third way, when the fingerprint sensor includes the AFD module and the DFD module, the AFD module is configured to detect whether the object contacts with the fingerprint sensor, the DFD module is configured to detect whether the object contacting with the fingerprint sensor is a finger, and the object detecting function of the fingerprint sensor is realized by the AFD module.

In a fourth way, when the fingerprint sensor includes the AFD module and the DFD module, and the terminal is in a locked state, the AFD module is configured to detect whether the object contacts with the fingerprint sensor, and the object detecting function of the fingerprint sensor is realized by the AFD module; when the terminal is in an unlocked state, the DFD module is configured to detect whether the object contacts with the fingerprint sensor, and the object detecting function of the fingerprint sensor is realized by the DFD module.

In a practical application, after a target fingerprint detection module (i.e., a module configured to detect the fingerprint in the terminal) detects that the object contacts with the fingerprint sensor, the fingerprint sensor starts to collect the fingerprint. When a sensitivity of the target fingerprint detection module is relatively high, once the object contacts with the fingerprint sensor, it may be detected by the target fingerprint detection module, leading to a great possibility of an unintended touch. When the sensitivity of the target fingerprint detection module is relatively low, it may not be detected by the target fingerprint detection module when the object contacts with the fingerprint sensor, thereby reducing the possibility of the unintended touch. Therefore, the sensitivity of the fingerprint sensor may be represented by the sensitivity of the fingerprint target fingerprint detection module.

In the related arts, since the sensitivity of the fingerprint sensor in the terminal after the terminal leaves the factory is fixed, a flexibility of the fingerprint sensor for recognizing the fingerprint is poor.

Figure 2:
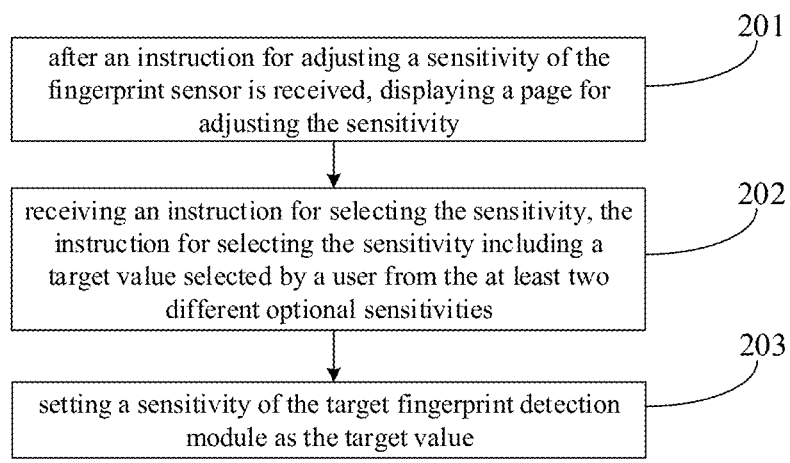
FIG. 2 is a flow chart of a method for controlling a fingerprint sensor according to an exemplary embodiment of the present disclosure.

In order to solve the above problems, embodiments of the present disclosure provide a method for controlling a fingerprint sensor. As illustrated in FIG. 2, which illustrates a flow chart of a method for controlling a fingerprint sensor according to an exemplary embodiment of the present disclosure, the method may include following acts.

At block 201, after an instruction for adjusting a sensitivity of the fingerprint sensor is received, a page for adjusting the sensitivity is displayed. For example, the terminal may display the page for adjusting the sensitivity in a specific application or setting after receiving the instruction for adjusting the sensitivity.

At least two different optional sensitivities of a target fingerprint detection module in the fingerprint sensor are displayed on the page for adjusting the sensitivity.

At block 202, an instruction for selecting the sensitivity is received. The instruction for selecting the sensitivity includes a target value selected by a user from the at least two different optional sensitivities. Alternatively, the target value may be generated by the terminal according to a user input on the terminal. For example, the target value may be generated by the terminal according to the user finger pressure detected by a sensor of the terminal. When the pressure detected by the finger print sensor increases, the target value also increases proportionally.

At block 203, a target sensitivity of the target fingerprint detection module is set as the target value. For example, the terminal may set the target sensitivity of the target fingerprint detection module so that the target fingerprint detection module responds to user inputs on the fingerprint sensor according to the target sensitivity.

In conclusion, with the method for controlling the fingerprint sensor according to the embodiments of the present disclosure, after the instruction for adjusting the sensitivity of the fingerprint sensor is received, the page for adjusting the sensitivity may be displayed, in which the at least two different optional sensitivities of the target fingerprint detection module in the fingerprint sensor are displayed on the page for adjusting the sensitivity. When the user selects the target value from the at least two different optional sensitivities, the target sensitivity of the target fingerprint detection module is set as the target value. Further, the terminal may adjust the target sensitivity of the target fingerprint detection module based on other sensor inputs, which may include ambient light from the light sensor, local time from an internal clock, local temperature from a temperature sensor, etc. Thus, the user may select different sensitivities according to actual situations, thereby improving a flexibility of the fingerprint sensor when recognizing the fingerprint.

Figure 3A:
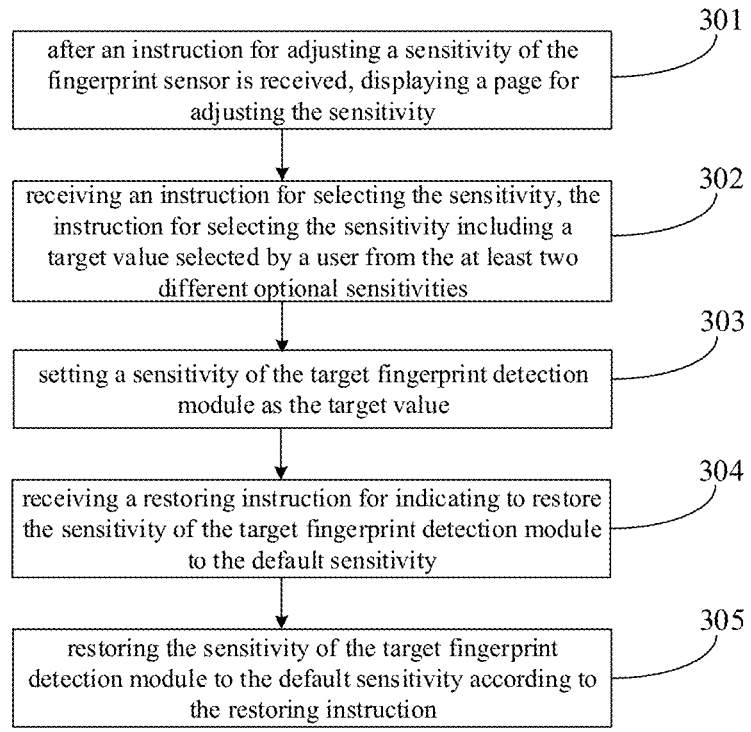
FIG. 3A is a flow chart of a method for controlling a fingerprint sensor according to another exemplary embodiment of the present disclosure.

Referring to FIG. 3A, which illustrates a flow chart of a method for controlling a fingerprint sensor according to another exemplary embodiment of the present disclosure, the method may include followings.

At block 301, after an instruction for adjusting a sensitivity of the fingerprint sensor is received, a page for adjusting the sensitivity is displayed.

At least two different optional sensitivities of a target fingerprint detection module in the fingerprint sensor are displayed on the page for adjusting the sensitivity.

In a practical application, since the number of the target sensors included in the fingerprint sensor may be different, the present disclosure takes the following two cases for a schematic description.

In a first case, the fingerprint sensor may include one target fingerprint detection module which may be an AFD module or a DFD module. If the fingerprint sensor may include one target fingerprint detection module, the object detecting function of the fingerprint sensor may be realized in several ways as (the first way, the second way and the third way) described above, which will not be illustrated in detail herein.

In a practical application, there are various implementable ways for displaying the at least two different optional sensitivities of the target fingerprint detection module on the page for adjusting the sensitivity. Embodiments of the present disclosure take the following two implementation ways as examples for a schematic description.

Figure 3B:
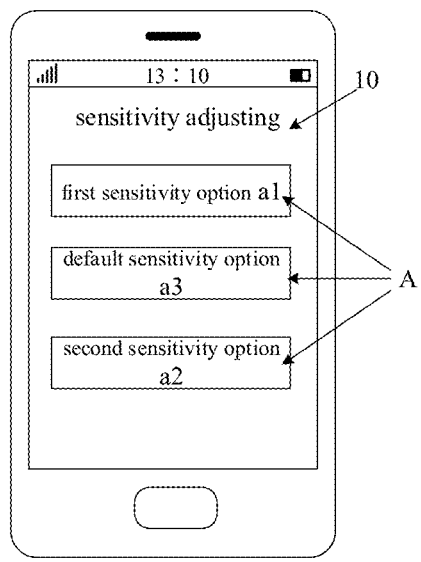
FIG. 3B is an effect diagram illustrating a page for adjusting a sensitivity according to an exemplary embodiment of the present disclosure.

In a first implementable way, as illustrated in FIG. 3B, at least two sensitivity options A may be displayed on the page 10 for adjusting the sensitivity, and each of the at least two sensitivity options A corresponds to a sensitivity value. Exemplarily, the at least two sensitivity options A may include: a first sensitivity option a1, a second sensitivity option a2 and a default sensitivity option a3, which correspond to a first sensitivity, a second sensitivity and a default sensitivity respectively. The first sensitivity is greater than the default sensitivity, and the default sensitivity is greater than the second sensitivity.

Figure 3C:
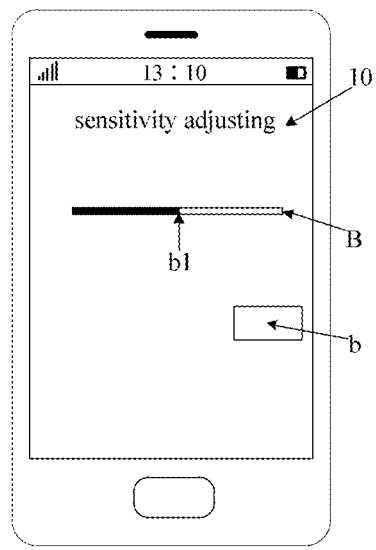
FIG. 3C is an effect diagram illustrating a page for adjusting a sensitivity according to another exemplary embodiment of the present disclosure.

In a second implementable way, as illustrated in FIG. 3C, a progress bar B for adjusting the sensitivity may be displayed on the page 10 for adjusting the sensitivity, and each point on the progress bar B corresponds to a sensitivity value. Exemplarily, sensitivity values corresponding to points on the progress bar B from left to right increase gradually, the sensitivity value corresponding to a midpoint b1 on the progress bar B may be a default sensitivity.

At this time, sensitivity adjusting values displayed on the page 10 for adjusting the sensitivity may be values of the sensitivity of the AFD module or of the sensitivity of the DFD module.

In a second case, the fingerprint sensor may include two target fingerprint detection modules which are an AFD module and a DFD module respectively. The operating principle of the AFD module and the DFD module refers to the fourth way as described above, which will not be illustrated in detail herein.

In a practical application, there are various alternative implementation ways for displaying the at least two different optional sensitivities of the target fingerprint detection module on the page for adjusting the sensitivity. Embodiments of the present disclosure take the following two implementation ways as examples for a schematic description.

Figure 3D:
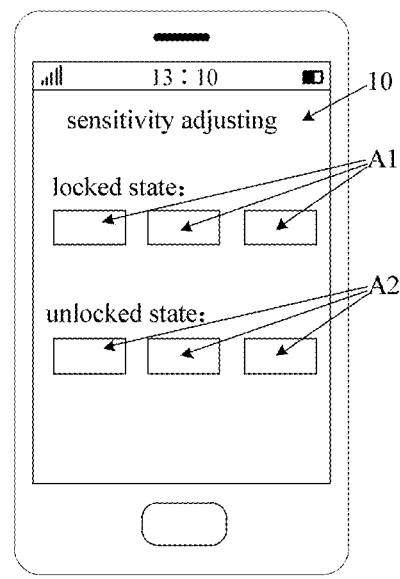
FIG. 3D is an effect diagram illustrating a page for adjusting a sensitivity according to yet another exemplary embodiment of the present disclosure.

In a first alternative implementation way, as illustrated in FIG. 3D, two groups of sensitivity options may be displayed on the page 10 for adjusting the sensitivity. The two groups may include a first group of sensitivity options A1 and a second group of sensitivity options A2. Each of the two groups may include at least two sensitivity options. Each of the at least two sensitivity options corresponds to a sensitivity value. The first group of sensitivity options A1 is configured to indicate values of the sensitivity of the fingerprint sensor when the terminal is in a locked state, in other words, the first group of sensitivity options A1 is configured to indicate different values of the sensitivity of the AFD module; the second group of sensitivity options A2 is configured to indicate values of the sensitivity of the fingerprint sensor when the terminal is in an unlocked state, in other words, the first group of sensitivity options A2 is configured to indicate different values of the sensitivity of the DFD module. It should be noted that, in each group of the sensitivity options, the corresponding principle between the values of the sensitivity and the sensitivity options may refer to the first implementable way, which will not be described in detail herein.

Figure 3E:
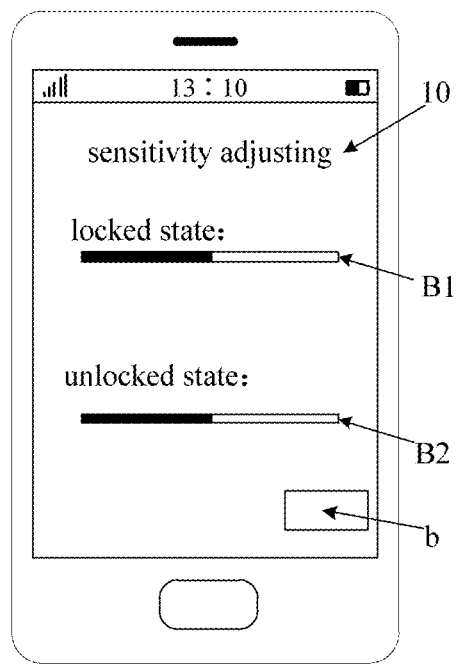
FIG. 3E is an effect diagram illustrating a page for adjusting a sensitivity according to still another exemplary embodiment of the present disclosure.

In a second alternative implementation way, as illustrated in FIG. 3E, two progress bars for adjusting the sensitivity may be displayed on the page 10 for adjusting the sensitivity. The two progress bars may include a first progress bar B1 for adjusting the sensitivity and a second progress bar B2 for adjusting the sensitivity. Each point on each progress bar corresponds to a sensitivity value. The first progress bar B1 is configured to indicate values of the sensitivity of the fingerprint sensor when the terminal is in a locked state, in other words, the first progress bar B1 is configured to indicate different values of the sensitivity of the AFD module; the second progress bar B2 is configured to indicate values of the sensitivity of the fingerprint sensor when the terminal is in an unlocked state, in other words, the second progress bar B2 is configured to indicate different values of the sensitivity of the DFD module. It should be noted that, the corresponding principle between the values of the sensitivity and the points on each progress bar may refer to the second implementable way, which will not be described in detail herein.

At this time, sensitivity adjusting values displayed on the page 10 for adjusting the sensitivity may be values of the sensitivity of the AFD module and of the sensitivity of the DFD module.

In one or more embodiments, the default sensitivity described above is a factory setting sensitivity of the target fingerprint detection module included in the fingerprint sensor.

Figure 3F:
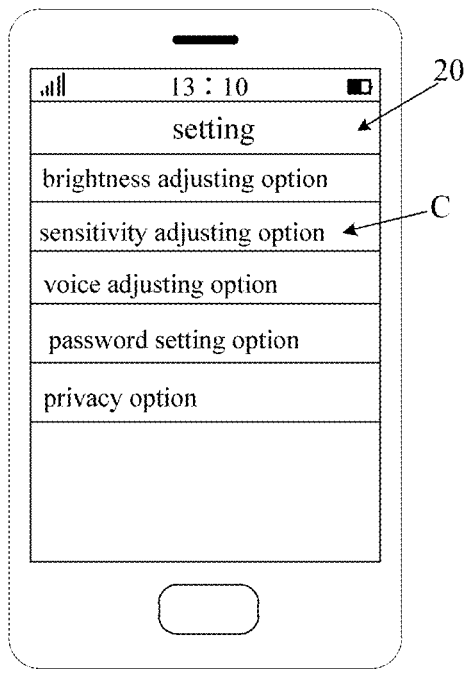
FIG. 3F is an effect diagram illustrating a preset setting page according to an exemplary embodiment of the present disclosure.
Figure 3G:
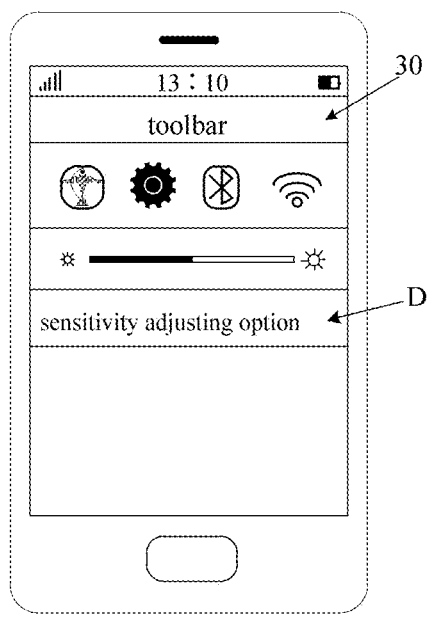
FIG. 3G is an effect diagram illustrating a toolbar according to an exemplary embodiment of the present disclosure.

As illustrated in FIG. 3F, the instruction for adjusting the sensitivity may be: an adjusting instruction triggered when an option C for adjusting the sensitivity of the fingerprint sensor displayed on a preset setting page 20 is selected; as illustrated in FIG. 3G, the instruction for adjusting the sensitivity may also be: an adjusting instruction triggered when an option D for adjusting the sensitivity of the fingerprint sensor displayed in a toolbar 30 is selected.

At block 302, an instruction for selecting the sensitivity is received. The instruction for selecting the sensitivity includes a target value selected by a user from the at least two different optional sensitivities.

In one example, regarding to the first case above, when a user uses the fingerprint sensor in the terminal, for example, the user takes an unlocking operation or uses a fingerprint payment function and the like, after the finger touches the fingerprint sensor slightly, the fingerprint sensor fails to recognize the fingerprint, and when the finger applies a pressure on the fingerprint sensor, the fingerprint sensor can recognize the fingerprint successfully. At this time, it may be considered by the user that the sensitivity of the fingerprint sensor is low and the user may turn up the value of the sensitivity displayed on the page for adjusting the sensitivity. For example, the user may choose the first sensitivity option a1 illustrated in FIG. 3B.

Figures 3H, 3I:
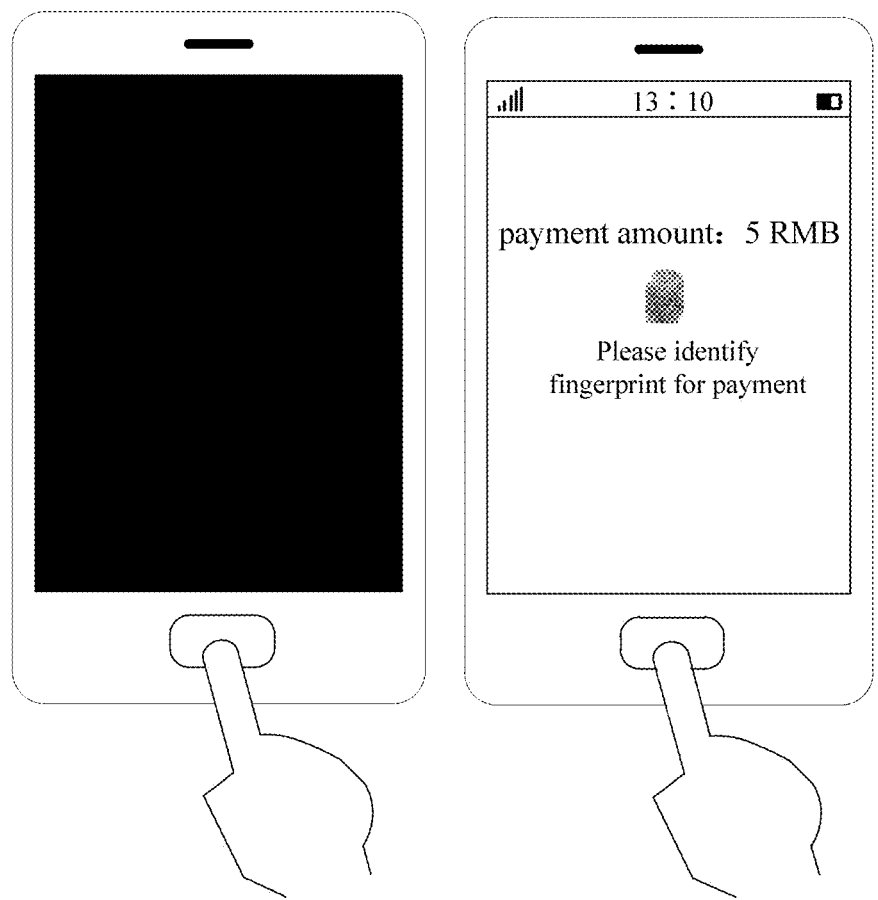
FIG. 3H is an effect diagram illustrating operations for unlocking a terminal when the terminal is in a locked state according to an exemplary embodiment of the present disclosure.
FIG. 3I is an effect diagram illustrating operations of using a fingerprint payment function when a terminal is in an unlocked state according to an exemplary embodiment of the present disclosure.

In another example, regarding to the second case above, when the terminal is in a locked state and the user uses the fingerprint sensor, for example, as illustrated in FIG. 3H, the user may unlock the terminal when the terminal is in the locked state. If the user considered that the sensitivity of the fingerprint sensor is low, the user may turn up the value of the sensitivity displayed on the page for adjusting the sensitivity. For example, the user may adjust the first progress bar B1 illustrated in FIG. 3E, such that the value of the sensitivity of the AFD module increases when the terminal is in the locked state.

When the terminal is in an unlocked state and the user uses the fingerprint sensor, for example, as illustrated in FIG. 3I, the user may use the fingerprint payment function when the terminal is in the unlocked state. If the user considered that the sensitivity of the fingerprint sensor is low, the user may turn up the value of the sensitivity displayed on the page for adjusting the sensitivity. For example, the user may adjust the second progress bar B2 illustrated in FIG. 3E, such that the value of the sensitivity of the DFD module increases when the terminal is in the locked state.

At block 303, a sensitivity of the target fingerprint detection module is set as the target value.

For example, after the terminal receives the target value selected by a user from the at least two different optional sensitivities, the sensitivity of the target fingerprint detection module is set as the target value, thereby adjusting the sensitivity of the fingerprint sensor according to the user's requirement.

At block 304, a restoring instruction for indicating to restore the sensitivity of the target fingerprint detection module to the default sensitivity is received.

Here, regarding to the situation that the progress bar is displayed on the page for adjusting the sensitivity described above, for example, in the page 10 for adjusting the sensitivity illustrated in FIG. 3C and FIG. 3E, the user may be unable to acquire a suitable sensitivity after adjusting for several times. Therefore, the adjusted sensitivity may bring a poor user experience, and it is difficult for the user to restore the default sensitivity again. Thus, in embodiments of the present disclosure, as illustrated in FIG. 3C and FIG. 3E, an option b for indicating to restore the sensitivity of the target fingerprint detection module to the default sensitivity may be displayed on the page 10 for adjusting the sensitivity, the user may trigger the restoring instruction for indicating to restore the sensitivity of the target fingerprint detection module to the default sensitivity by clicking the option b.

At block 305, the sensitivity of the target fingerprint detection module is restored to the default sensitivity according to the restoring instruction.

For example, after the restoring instruction is received, the sensitivity of the target fingerprint detection module is restored to the default sensitivity according to the restoring instruction.

Figure 4:
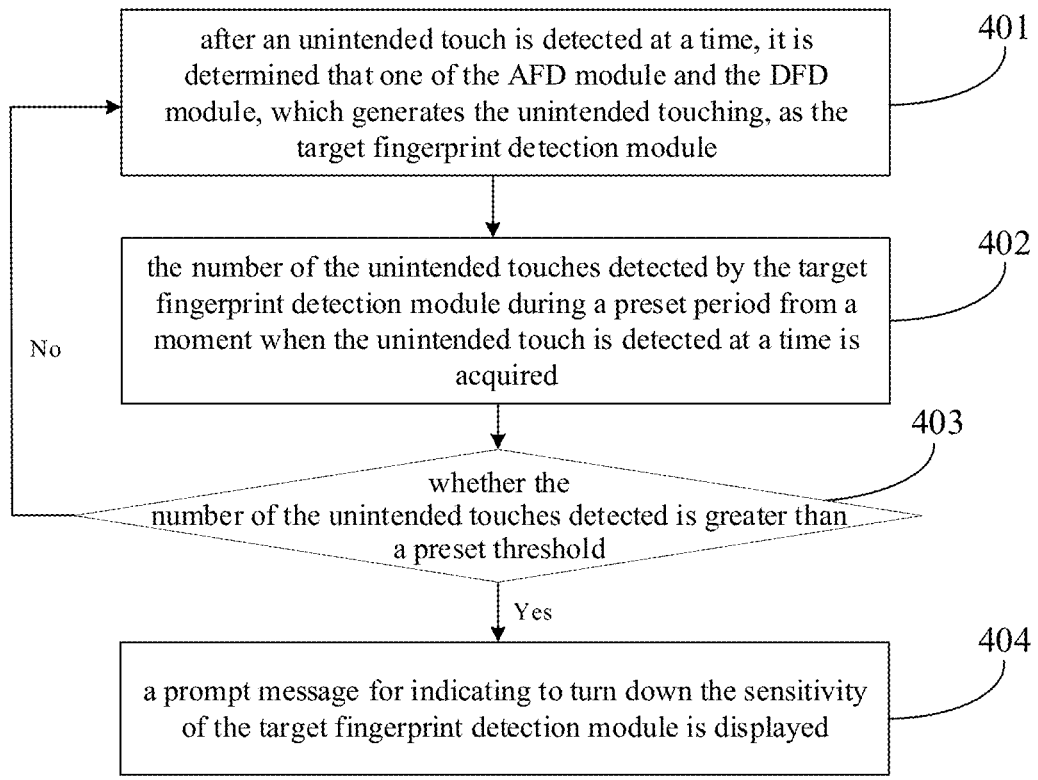
FIG. 4 is a flow chart of a method for controlling a fingerprint sensor according to another exemplary embodiment of the present disclosure.

It should be noted that, the user is only able to determine a situation that the sensitivity of the fingerprint sensor is low, not a situation that the sensitivity of the fingerprint sensor is high, which could be determined by the terminal. As illustrated in FIG. 4, which is a flow chart of a method for controlling a fingerprint sensor according to another exemplary embodiment of the present disclosure, the method may also include following acts.

At block 401, after an unintended touch is detected at a time, it is determined that one of the AFD module and the DFD module, which generates the unintended touch, as the target fingerprint detection module.

In embodiments of the present disclosure, the block 401 may be combined with the second case above. In other words, when the fingerprint sensor includes two target fingerprint detection modules, after the unintended touch is detected at a time, it may be determined that one of the AFD module and the DFD module, which generates the unintended touch, as the target fingerprint detection module.

For example, after the unintended touch is detected at a time, a state of the terminal may be detected. When the terminal is in a locked state, it is determined that the target fingerprint detection module is the AFD module, and when the terminal is in an unlocked state, it is determined that the target fingerprint detection module is the DFD module.

It should be noted that, for the above first case, i.e., when the fingerprint sensor includes one target fingerprint detection module, after the unintended touch is detected at a time, block 402 may be performed directly.

At block 402, the number of the unintended touches detected by the target fingerprint detection module during a preset period from a moment when the unintended touch is detected at a time is acquired.

Here, the preset period may be one minute, 30 seconds, or a period set by the user. The moment when the unintended touch is generated is the moment when the unintended touch is detected at a time. It should be noted that, the acquired number of the unintended touches detected by the target fingerprint detection module may include the unintended touch detected at a time or not.

At block 403, it is determined whether the number of the unintended touches detected is greater than a preset threshold.

Here, when the number of the unintended touches detected is greater than the preset threshold, block 404 is performed, and when the number of the unintended touches detected is not greater than the preset threshold, block 401 is performed again.

For example, the preset threshold may be 20. When the terminal is put into the user's pocket, the fingerprint sensor may maintain contacting with other objects, and at this time, after the terminal detects the unintended touch at a time, when the number of the unintended touches detected by the target fingerprint detection module lasting for one minute from a moment when the unintended touch is detected at a time is 30, block 404 is performed; when the detected number of the unintended touches is 15, block 401 is performed again.

At block 404, a prompt message for indicating to change the sensitivity of the target fingerprint detection module is displayed. For example, the prompt message may suggest the user to turn down the target sensitivity of the target fingerprint detection module.

In a practical application, at meantime of displaying the prompt message, the terminal may lock the fingerprint sensor. In other words, the locked fingerprint sensor stops working. At this time, after the user adjusts the sensitivity of the target fingerprint detection module, the fingerprint sensor may be restarted to allow the fingerprint sensor working normally.

For example, regarding to the above first case, the prompt message for indicating to turn down the sensitivity of the target fingerprint detection module is displayed directly.

Regarding to the above second case, when the target fingerprint detection module is AFD module, the prompt message for indicating to turn down the sensitivity of the AFD module is displayed, for example, the prompt message may be: a prompt message for indicating to turn down the sensitivity of the first process bar B1 in FIG. 2-4$d$; when the target fingerprint detection module is DFD module, the prompt message for indicating to turn down the sensitivity of the DFD module is displayed, for example, the prompt message may be: a prompt message for indicating to turn down the sensitivity of the second process bar B2 in FIG. 2-4$d$.

It should be noted that, an option for adjusting the sensitivity may be displayed in the prompt message, and when the option is selected, the page for adjusting the sensitivity may be displayed.

In a practical application, the fingerprint identification component is arranged on the front side of the terminal. The fingerprint identification component may include a cover plate covering on the fingerprint sensor. The material, color or thickness of the cover plate may affect the sensitivity of the fingerprint identification component. In general, the sensitivity of the fingerprint identification component may be affected by the sensitivity of the fingerprint sensor and the cover plate. Even though the fingerprint sensors are same, when the cover plates are different, the sensitivities of the fingerprint identification components may be different. In a practical application, for same version cover plates, the thicknesses thereof may have tolerance in the manufacturing process, producing different cover plates with different thicknesses. Even though same version terminals use fingerprint sensors with same sensitivities, the sensitivities of the fingerprint identification components finally produced may be different due to the influence of the cover plates, such that the possibility of the unintended touch detected by same version terminals may be different. However, in the related arts, it is difficult to adjust the sensitivities of the fingerprint identification components for individual terminals.

In embodiments of the present disclosure, the sensitivity of the fingerprint identification component may be adjusted by adjusting the sensitivity of the fingerprint sensor, so as to reduce the errors of the sensitivities of the fingerprint identification components in different terminals caused by the cover plates, such that the sensitivity of the fingerprint identification component may be adaptive to the terminal, thereby improving the flexibility of the fingerprint identification component.

In conclusion, with the method for controlling the fingerprint sensor according to the embodiments of the present disclosure, after the instruction for adjusting the sensitivity of the fingerprint sensor is received, the page for adjusting the sensitivity may be displayed, in which the at least two different optional sensitivities of the target fingerprint detection module in the fingerprint sensor are displayed on the page. When the user selects the target value from the at least two different optional sensitivities, the sensitivity of the target fingerprint detection module is set as the target value. Thus, the user may select different sensitivities according to actual situations, such that an error on the sensitivity of the fingerprint identification component caused by a cover of the terminal may be reduced, and the sensitivity of the fingerprint identification component is suitable for the terminal, thereby improving a flexibility of the fingerprint sensor when recognizing the fingerprint.

It should be noted that, steps of the method for controlling the fingerprint sensor provided by embodiments of the present disclosure may be reordered properly, and the steps may be added or deleted according to actual situations, any modification of the method in the scope of the present disclosure used by skilled in the art may be included in the scope of the present disclosure, which will not be described herein.

Figure 5A:
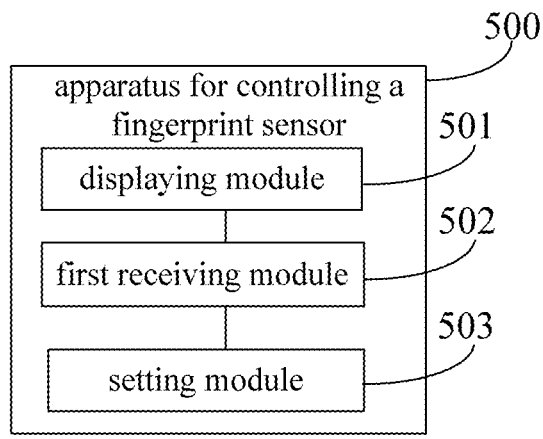
FIG. 5A is a block diagram illustrating an apparatus for controlling a fingerprint sensor according to an exemplary embodiment of the present disclosure.

Embodiments of the present disclosure also provide an apparatus for controlling a fingerprint sensor. As illustrated in FIG. 5A, which is a block diagram illustrating an apparatus for controlling a fingerprint sensor according to an exemplary embodiment of the present disclosure, the apparatus 500 for controlling the fingerprint sensor may include a displaying module 501, a first receiving module 502 and a setting module 503.

The displaying module 501 is configured to, after an instruction for adjusting a sensitivity of the fingerprint sensor is received, display a page for adjusting the sensitivity. At least two different optional sensitivities of a target fingerprint detection module in the fingerprint sensor are displayed on the page.

The first receiving module 502 is configured to receive an instruction for selecting the sensitivity. The instruction for selecting the sensitivity includes a target value selected by a user from the at least two different optional sensitivities.

The setting module 503 is configured to set a sensitivity of the target fingerprint detection module as the target value.

In conclusion, with the apparatus for controlling the fingerprint sensor according to the embodiments of the present disclosure, after the instruction for adjusting the sensitivity of the fingerprint sensor is received, the page for adjusting the sensitivity may be displayed, in which the at least two different optional sensitivities of the target fingerprint detection module in the fingerprint sensor are displayed on the page. When the user selects the target value from the at least two different optional sensitivities, the sensitivity of the target fingerprint detection module is set as the target value. Thus, the user may select different sensitivities according to actual situations, thereby improving a flexibility of the fingerprint sensor when recognizing the fingerprint. Each module in the present disclosure may be implemented at least partially using a hardware processor or an integrated circuit (IC) chip.

Figure 5B:
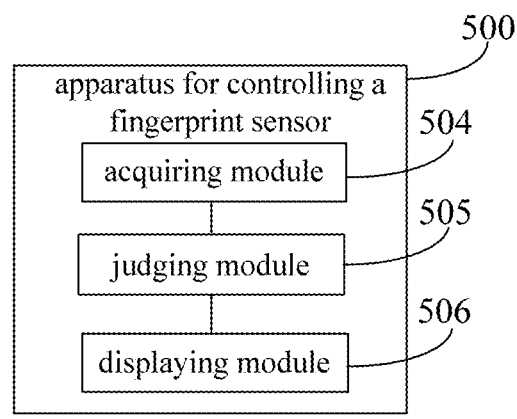
FIG. 5B is a block diagram illustrating an apparatus for controlling a fingerprint sensor according to another exemplary embodiment of the present disclosure.

As illustrated in FIG. 5B, which is a block diagram illustrating an apparatus for controlling a fingerprint sensor according to another exemplary embodiment of the present disclosure, the apparatus 500 for controlling the fingerprint sensor may also include an acquiring module 504, a judging module 505 and a displaying module 506.

The acquiring module 504 is configured to, after an unintended touch is detected at a time, acquire the number of the unintended touches detected by the target fingerprint detection module during a preset period from a moment when the unintended touch is detected at a time.

The judging module 505 is configured to determine whether the number of the unintended touches detected is greater than a preset threshold.

The displaying module 506 is configured to display a prompt message for indicating to change the target sensitivity of the target fingerprint detection module when the number of the unintended touches detected is greater than the preset threshold.

Figure 5C:
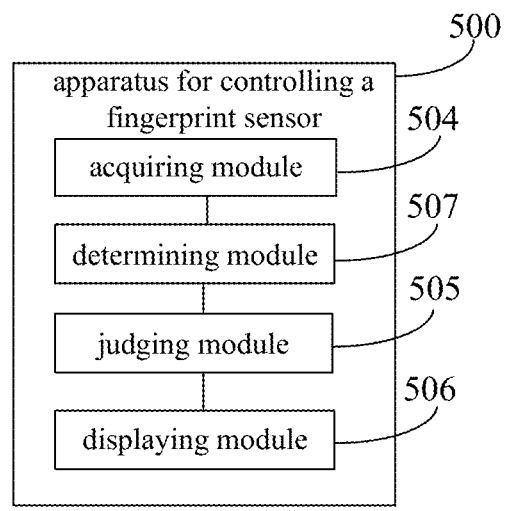
FIG. 5C is a block diagram illustrating an apparatus for controlling a fingerprint sensor according to yet another exemplary embodiment of the present disclosure.

In one or more embodiments, the fingerprint sensor may include a digital fingerprint detection module and an analog fingerprint detection module. As illustrated in FIG. 5C, which is a block diagram illustrating an apparatus for controlling a fingerprint sensor according to yet another exemplary embodiment of the present disclosure, the apparatus for controlling the fingerprint sensor may also include a determining module 507.

The determining module 507 is configured to, after the unintended touch is detected at a time, determine that one of the digital fingerprint detection module and the analog fingerprint detection module, which generates the unintended touch, as the target fingerprint detection module.

In some embodiments, the fingerprint sensor may include two target fingerprint detection modules, i.e., a digital fingerprint detection module and an analog fingerprint detection module.

In some embodiments, at least two sensitivity options are displayed on the page, and each of the at least two sensitivity options indicates a sensitivity value; or, a progress bar for adjusting the sensitivity is displayed on the page, and each point on the progress bar indicates a sensitivity value.

In one or more embodiments, the at least two different optional sensitivities include: a first sensitivity, a second sensitivity and a default sensitivity. The first sensitivity is greater than the default sensitivity, and the default sensitivity is greater than the second sensitivity.

In one or more embodiments, the default sensitivity is a factory setting sensitivity of the target fingerprint detection module included in the fingerprint sensor.

Figure 5D:
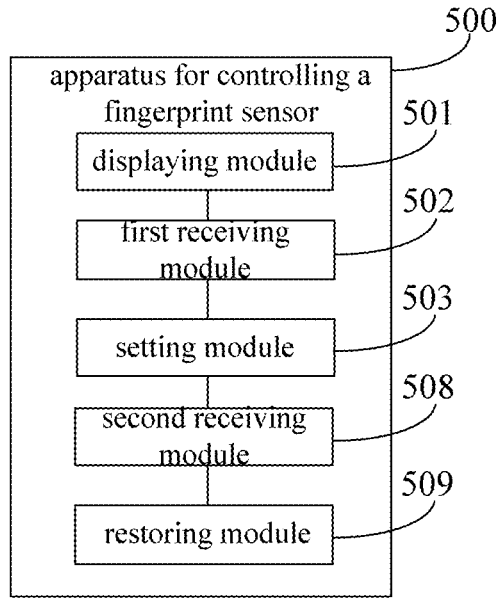
FIG. 5D is a block diagram illustrating an apparatus for controlling a fingerprint sensor according to still another exemplary embodiment of the present disclosure.

As illustrated in FIG. 5D, which is a block diagram illustrating an apparatus for controlling a fingerprint sensor according to still another exemplary embodiment of the present disclosure, the apparatus for controlling the fingerprint sensor may also include a second receiving module 508 and a restoring module 509.

The second receiving module 508 is configured to receive a restoring instruction for indicating to restore the sensitivity of the target fingerprint detection module to the default sensitivity.

The restoring module 509 is configured to restore the sensitivity of the target fingerprint detection module to the default sensitivity according to the restoring instruction.

In some embodiments, the instruction for adjusting the sensitivity may refer to: an adjusting instruction triggered when an option for adjusting the sensitivity of the fingerprint sensor displayed on a preset setting page is selected; or, an adjusting instruction triggered when an option for adjusting the sensitivity of the fingerprint sensor displayed in a toolbar is selected.

It is obvious for the skilled in the art that, for convenience and simplification of description, specific operating processes of the apparatus and modules described above may refer to the corresponding process of the method embodiments, which will not be described in detail herein.

In conclusion, with the apparatus for controlling the fingerprint sensor according to the embodiments of the present disclosure, after the instruction for adjusting the sensitivity of the fingerprint sensor is received, the page for adjusting the sensitivity may be displayed, in which the at least two different optional sensitivities of the target fingerprint detection module in the fingerprint sensor are displayed on the page for adjusting the sensitivity. When the user selects the target value from the at least two different optional sensitivities, the sensitivity of the target fingerprint detection module is set as the target value. Thus, the user may select different sensitivities according to actual situations, such that an error on the sensitivity of the fingerprint identification component caused by a cover of the terminal may be reduced, and the sensitivity of the fingerprint identification component is suitable for the terminal, thereby improving a flexibility of the fingerprint sensor when recognizing the fingerprint.

Embodiments of the present disclosure also provide a device for controlling a fingerprint sensor, including a processor; and a memory configured to store instructions executable by the processor. The processor is configured to: after an instruction for adjusting a sensitivity of the fingerprint sensor is received, display a page for adjusting the sensitivity, in which, at least two different optional sensitivities of a target fingerprint detection module in the fingerprint sensor are displayed on the page; receive an instruction for selecting the sensitivity, the instruction for selecting the sensitivity including a target value selected by a user from the at least two different optional sensitivities; and set a sensitivity of the target fingerprint detection module as the target value.

Figure 6:
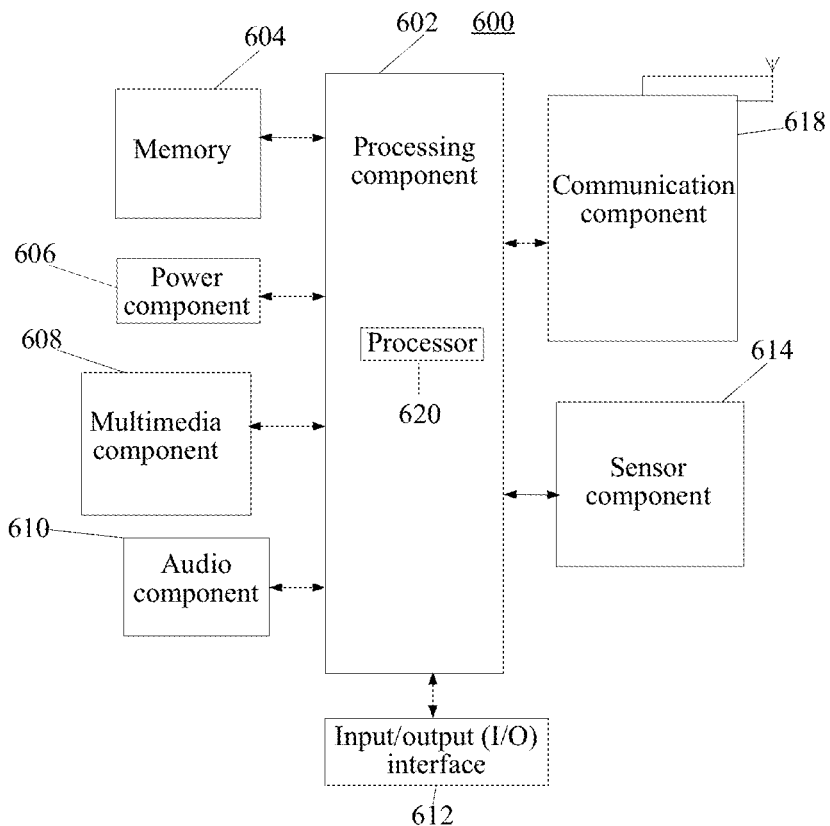
FIG. 6 is a block diagram illustrating a device for controlling a fingerprint sensor according to an exemplary embodiment of the present disclosure.

FIG. 6 is a block diagram of a device for controlling a fingerprint sensor according to an exemplary embodiment of the present disclosure. For example, the device 600 may be a mobile phone, a computer, a digital broadcasting terminal, a message sending and receiving equipment, a game controller, a tablet device, a medical device, fitness equipment, a personal digital assistant or the like.

Referring to FIG. 6, the device 600 may include one or more of the following components: a processing component 602, a memory 604, a power component 606, a multimedia component 608, an audio component 610, an input/output (I/O) interface 612, a sensor component 614, and a communication component 616.

The processing component 602 typically controls overall operations of the device 600, such as the operations associated with display, telephone calls, data communications, camera operations, and recording operations. The processing component 602 may include one or more processors 620 to execute instructions to perform all or part of the steps in the above described methods. Moreover, the processing component 602 may include one or more modules which facilitate the interaction between the processing component 602 and other components. For instance, the processing component 602 may include a multimedia module to facilitate the interaction between the multimedia component 608 and the processing component 602.

The memory 604 is configured to store various types of data to support the operation of the device 600. Examples of such data include instructions for any applications or methods operated on the device 600, contact data, phonebook data, messages, pictures, video, etc. The memory 604 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 606 provides power to various components of the device 600. The power component 606 may include a power management system, one or more power sources, and any other components associated with the generation, management, and distribution of power in the device 600.

The multimedia component 608 includes a screen providing an output interface between the device 600 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 608 includes a front camera and/or a rear camera. The front camera and the rear camera may receive an external multimedia datum while the device 600 is in an operation mode, such as a photographing mode or a video mode. Each of the front camera and the rear camera may be a fixed optical lens system or have focus and optical zoom capability.

The audio component 610 is configured to output and/or input audio signals. For example, the audio component 610 includes a microphone ("MIC") configured to receive an external audio signal when the device 600 is in an operation mode, such as a call mode, a recording mode, and a voice recognition mode. The received audio signal may be further stored in the memory 604 or transmitted via the communication component 616. In some embodiments, the audio component 610 further includes a speaker to output audio signals.

The I/O interface 612 provides an interface between the processing component 602 and peripheral interface modules, such as a keyboard, a click wheel, buttons, and the like. The buttons may include, but are not limited to, a home button, a volume button, a starting button, and a locking button.

The sensor component 614 includes one or more sensors to provide status assessments of various aspects of the device 600. For instance, the sensor component 614 may detect an open/closed status of the device 600, relative positioning of components, e.g., the display and the keypad, of the device 600, a change in position of the device 600 or a component of the device 600, a presence or absence of user contact with the device 600, an orientation or an acceleration/deceleration of the device 600, and a change in temperature of the device 600. The sensor component 614 may include a proximity sensor configured to detect the presence of nearby objects without any physical contact. The sensor component 614 may also include a light sensor, such as a CMOS or CCD image sensor, for use in imaging applications. In some embodiments, the sensor component 614 may also include an accelerometer sensor, a gyroscope sensor, a magnetic sensor, a pressure sensor, or a temperature sensor.

The communication component 616 is configured to facilitate communication, wired or wirelessly, between the device 600 and other devices. The device 600 can access a wireless network based on a communication standard, such as WiFi, 2G, or 3G, or a combination thereof. In one exemplary embodiment, the communication component 616 receives a broadcast signal or broadcast associated information from an external broadcast management system via a broadcast channel. In one exemplary embodiment, the communication component 616 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 600 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In one or more embodiments, there is also provided a non-transitory computer-readable storage medium including instructions, such as included in the memory 604, executable by the processor 620 in the device 600, for performing the above-described methods. For example, the non-transitory computer-readable storage medium may be a ROM, a RAM, a CD-ROM, a magnetic tape, a floppy disc, an optical data storage device, and the like.

A non-transitory computer-readable storage medium has stored therein instructions that, when executed by a processor of a mobile terminal, causes the mobile terminal to perform a method for calculating a pollutant absorption quantity. The method includes: after an instruction for adjusting a sensitivity of the fingerprint sensor is received, displaying a page for adjusting the sensitivity, in which, at least two different optional sensitivities of a target fingerprint detection module in the fingerprint sensor are displayed on the page; receiving an instruction for selecting the sensitivity, in which, the instruction for selecting the sensitivity includes a target value selected by a user from the at least two different optional sensitivities; and setting a sensitivity of the target fingerprint detection module as the target value.

It would be understood by those skilled in the art that all or a part of the steps carried by the method in the above-described embodiments may be completed hardware or by relevant hardware instructed by a program stored in the computer readable storage medium. The computer readable storage medium may be read-only memories, magnetic disks, or optical disks and the like.

The present disclosure has been described are merely the preferred embodiments without limiting the present disclosure. Various changes and modifications of the present disclosure may be made without departing from the spirit and scope of the present disclosure shall fall within the protection scope of the present invention.

What is claimed is:

1. A method for controlling a fingerprint sensor, comprising:

after an instruction for adjusting a sensitivity of the fingerprint sensor is received, displaying a page for adjusting the sensitivity, wherein at least two different optional sensitivities of a target fingerprint detection module in the fingerprint sensor are displayed on the page;

receiving an instruction for selecting the sensitivity, the instruction for selecting the sensitivity comprising a target value selected by a user from the at least two different optional sensitivities;

setting a target sensitivity of the target fingerprint detection module as the target value;

after a first unintended touch is detected at a detection time, acquiring a number of unintended touches detected by the target fingerprint detection module during a preset period, wherein the preset period begins from a moment when the first unintended touch is detected at the detection time;

determining whether the number of the unintended touches detected is greater than a preset threshold; and when the number of the unintended touches detected is greater than the preset threshold, displaying a prompt message for indicating to change the target sensitivity of the target fingerprint detection module.

2. The method according to claim 1, wherein the fingerprint sensor comprises a digital fingerprint detection module and an analog fingerprint detection module, and the method further comprises:

after the first unintended touch is detected at the detection time, determining that one of the digital fingerprint detection module and the analog fingerprint detection module, which generates the first unintended touch, as the target fingerprint detection module.

3. The method according to claim 1, wherein the fingerprint sensor comprises two target fingerprint detection modules comprising a digital fingerprint detection module and an analog fingerprint detection module.

4. The method according to claim 1, wherein, at least two sensitivity options are displayed on the page, and each of the at least two sensitivity options indicates a sensitivity value.

5. The method according to claim 4, wherein the at least two different optional sensitivities comprise:

a first sensitivity, a second sensitivity, and a default sensitivity; wherein the first sensitivity is greater than the default sensitivity and the default sensitivity is greater than the second sensitivity.

6. The method according to claim 5, wherein, the default sensitivity is a factory setting sensitivity of the target fingerprint detection module comprised in the fingerprint sensor.

7. The method according to claim 5, further comprising:

receiving a restoring instruction for indicating to restore the target sensitivity of the target fingerprint detection module to the default sensitivity; and restoring the target sensitivity of the target fingerprint detection module to the default sensitivity according to the restoring instruction.

8. The method according to claim 1, wherein, the instruction for adjusting the sensitivity of the fingerprint sensor refers to:

an adjusting instruction triggered when an option for adjusting the sensitivity of the fingerprint sensor displayed on a preset setting page is selected; or an adjusting instruction triggered when an option for adjusting the sensitivity of the fingerprint sensor displayed in a toolbar is selected.

9. A device for controlling a fingerprint sensor, comprising:

one or more processors; and a non-transitory computer-readable storage medium configured to store instructions executable by the one or more processors;

wherein the one or more processors are configured to:

after an instruction for adjusting a sensitivity of the fingerprint sensor is received, display a page for adjusting the sensitivity, wherein at least two different optional sensitivities of a target fingerprint detection module in the fingerprint sensor are displayed on the page;

receive an instruction for selecting the sensitivity, the instruction for selecting the sensitivity comprising a target value selected by a user from the at least two different optional sensitivities;

set a target sensitivity of the target fingerprint detection module as the target value, after a first unintended touch is detected at a detection time, acquire a number of unintended touches detected by the target fingerprint detection module during a preset period, wherein the preset period begins from a moment when the first unintended touch is detected at the detection time;

determine whether the number of the unintended touches detected is greater than a preset threshold; and when the number of the unintended touches detected is greater than the preset threshold, display a prompt message for indicating to change the target sensitivity of the target fingerprint detection module.

10. The device according to claim 9, wherein the fingerprint sensor comprises a digital fingerprint detection module and an analog fingerprint detection module, and the one or more processors are further configured to:

after the first unintended touch is detected at the detection time, determine that one of the digital fingerprint detection module and the analog fingerprint detection module, which generates the first unintended touch, as the target fingerprint detection module.

11. The device according to claim 9, wherein the fingerprint sensor comprises two target fingerprint detection modules comprising a digital fingerprint detection module and an analog fingerprint detection module.

12. The device according to claim 9, wherein at least two sensitivity options are displayed on the page, and each of the at least two sensitivity options indicates a sensitivity value.

13. The device according to claim 12, wherein the at least two different optional sensitivities comprise:

a first sensitivity, a second sensitivity and a default sensitivity;

wherein the first sensitivity is greater than the default sensitivity and the default sensitivity is greater than the second sensitivity.

14. The device according to claim 13, wherein, the default sensitivity is a factory setting sensitivity of the target fingerprint detection module comprised in the fingerprint sensor.

15. The device according to claim 13, wherein the one or more processors are further configured to:

receive a restoring instruction for indicating to restore the target sensitivity of the target fingerprint detection module to the default sensitivity; and restore the target sensitivity of the target fingerprint detection module to the default sensitivity according to the restoring instruction.

16. The device according to claim 9, wherein, the instruction for adjusting the sensitivity of the fingerprint sensor refers to:

an adjusting instruction triggered when an option for adjusting the sensitivity of the fingerprint sensor displayed on a preset setting page is selected; or an adjusting instruction triggered when an option for adjusting the sensitivity of the fingerprint sensor displayed in a toolbar is selected.

17. A non-transitory computer-readable storage medium having stored therein instructions for controlling a fingerprint sensor, wherein the instructions, when executed by one or more processors in a terminal, cause the terminal to perform acts comprising:

after an instruction for adjusting a sensitivity of the fingerprint sensor is received, displaying a page for adjusting the sensitivity, wherein at least two different optional sensitivities of a target fingerprint detection module in the fingerprint sensor are displayed on the page;

receiving an instruction for selecting the sensitivity, the instruction for selecting the sensitivity comprising a target value selected by a user from the at least two different optional sensitivities;

setting a target sensitivity of the target fingerprint detection module as the target value, after a first unintended touch is detected at a detection time, acquiring a number of unintended touches detected by the target fingerprint detection module during a preset period, wherein the preset period begins from a moment when the first unintended touch is detected at the detection time;

determining whether the number of the unintended touches detected is greater than a preset threshold; and when the number of the unintended touches detected is greater than the preset threshold, displaying a prompt message for indicating to turn down the target sensitivity of the target fingerprint detection module.

18. The non-transitory computer-readable storage medium according to claim 17, wherein the acts further comprise:

after the first unintended touch is detected at the detection time, determining that one of the digital fingerprint detection module and the analog fingerprint detection module, which generates the first unintended touch, as the target fingerprint detection module.

19. The non-transitory computer-readable storage medium according to claim 17, wherein the fingerprint sensor comprises two target fingerprint detection modules comprising a digital fingerprint detection module and an analog fingerprint detection module.

20. The non-transitory computer-readable storage medium according to claim 17, wherein at least two sensitivity options are displayed on the page, and wherein each of the at least two sensitivity options indicates a sensitivity value.

* * * * *